United States Patent
Genoud et al.

(10) Patent No.: US 9,350,499 B2
(45) Date of Patent: May 24, 2016

(54) CARRIER AGGREGATION TESTING METHOD AND APPARATUS FOR PERFORMING THE SAME

(71) Applicants: Olivier Genoud, Tokyo (JP); Pawel Matusz, Luton (GB)

(72) Inventors: Olivier Genoud, Tokyo (JP); Pawel Matusz, Luton (GB)

(73) Assignee: Anritsu Corporation, Tokyo (JP)

( * ) Notice: Subject to any disclaimer, the term of this patent is extended or adjusted under 35 U.S.C. 154(b) by 254 days.

(21) Appl. No.: 13/939,953

(22) Filed: Jul. 11, 2013

(65) Prior Publication Data

US 2014/0029440 A1  Jan. 30, 2014

(30) Foreign Application Priority Data

Jul. 24, 2012  (GB) .................................. 1213142.1

(51) Int. Cl.
*H04L 1/24* (2006.01)
*H04W 24/08* (2009.01)
*H04L 5/00* (2006.01)

(52) U.S. Cl.
CPC .................. *H04L 1/24* (2013.01); *H04L 5/001* (2013.01); *H04W 24/08* (2013.01)

(58) Field of Classification Search
IPC .......................... H04L 1/24,5/001; H04W 24/08
See application file for complete search history.

(56) References Cited

U.S. PATENT DOCUMENTS

| | | | |
|---|---|---|---|
| 2011/0081932 A1* | 4/2011 | Astely ..................... | H04L 5/001 455/509 |
| 2011/0200004 A1* | 8/2011 | Nakashima ......... | H04J 13/0062 370/330 |
| 2011/0269453 A1 | 11/2011 | Ranta-Aho et al. | |
| 2011/0287794 A1* | 11/2011 | Koskela ................ | H04W 28/08 455/509 |
| 2012/0147772 A1* | 6/2012 | Kazmi .................. | H04L 5/0078 370/252 |
| 2012/0320760 A1* | 12/2012 | Kim ...................... | H04W 74/08 370/242 |
| 2013/0210371 A1 | 8/2013 | Hashimoto et al. | |

FOREIGN PATENT DOCUMENTS

| | | |
|---|---|---|
| CN | 101841840 A | 9/2010 |
| CN | 102098696 A | 6/2011 |

(Continued)

OTHER PUBLICATIONS

3GPP TS 37.571-4, titled "Technical Specification Group Radio Access Network, Universal Terrestrial Radio Access (UTRA) and Evolved UTRA (E-UTRA) and Evolved Packet Core (EPC); User Equipment (UE) conformance specification for UE positioning; Part 4: Test suites (Release 10),"*

(Continued)

*Primary Examiner* — Andrew Lai
*Assistant Examiner* — Hoyet H Andrews
(74) *Attorney, Agent, or Firm* — Greer Burns & Crain Ltd.

(57) ABSTRACT

A carrier aggregation testing method for a wireless communication system, includes the steps of allocating a primary component carrier between a User Equipment and a carrier aggregation testing apparatus being configured to act as a Base Station with regard to the User Equipment, allocating at least one functionally limited secondary component carrier between the User Equipment and the carrier aggregation testing apparatus, aggregating the at least one functionally limited secondary component carrier with the primary component carrier, executing a carrier aggregation test being based on a functionality of the at least one functionally limited secondary component carrier.

10 Claims, 2 Drawing Sheets

(56) References Cited

FOREIGN PATENT DOCUMENTS

| | | |
|---|---|---|
| CN | 102143505 A | 8/2011 |
| JP | 2000-244446 | 9/2000 |
| JP | 2005-341424 | 12/2005 |
| JP | 2007-228404 | 9/2007 |
| JP | 2013-168721 | 8/2013 |

OTHER PUBLICATIONS

3GPP TS 36.523-3 V10.0.0 (Jun. 2012); 3rd Generation Partnership Project; Technical Specification Group Radio Access Network; Evolved Universal Terrestrial Radio Access (E-UTRA) and Evolved Packet Core (EPC); User Equipment (UE) conformance specification Part 3: Test Suites (Release 10).*

3GPP TS 36.300, titled Technical Specification Group Radio Access Network, Evolved Universal Terrestrial Radio Access (E-UTRA) and Evolved Universal Terrestrial Radio Access Network; (E-UTRAN); Overall description; Stage 2 (Release 11-V11.2.0).*

3GPP TS 36.523-3, titled "Technical Specification Group Radio Access Network, Evolved Universal Terrestrial Radio Access (E-UTRA) and Evolved Packet Core (EPC); User Equipment (UE) conformance specification Part 3: Test Suites (Release 10)", was published as Technical Specification by 3rd Generation Partnership Project on Jun. 2012, pp. 01-123.*

3GPP TS 37.571-4, titled "Technical Specification Group Radio Access Network, Universal Terrestrial Radio Access (UTRA) and Evolved UTRA (E-UTRA) and Evolved Packet Core (EPC); User Equipment (UE) conformance specification for UE positioning; Part 4: Test suites (Release 10)," was published on Jun. 2012, pp. 01 through 39.*

3GPP TS 36.300, titled Technical Specification Group Radio Access Network, Evolved Universal Terrestrial Radio Access (E-UTRA) and Evolved Universal Terrestrial Radio Access Network; (E-UTRAN); Overall description; Stage 2 (Release 11-V11.2.0), was publishedon Jun. 2012, pp. 01 through 201.*

R4-104436, titled "On the complexity of type 3i DC-HSPA testing", authored by TSG-RAN Working Group 4 (Radio) meeting # AH-04, during meeting in Xi'an, China, Oct. 11-15, 2010 and Source of Document for Discussion and Decision Ericsson, ST-Ericsson; Agenda Item 4.*

R4-104276, titled "Correction to Downlink Physical Channels in DC-HSDPA Tests", authored by TSG-RAN Working Group 4 (Radio) meeting # 57, during meeting in Jacksonville, Florida, US, Nov. 15-19, 2010 and Source of Change Request, Rohde & Schwarz; 25.101: CR 742.*

R5-103468, titled "DC-HSDPA Type 3i test cases: proposal for simplification", authored by TSG-RAN Working Group R5 meeting # 47, during meeting in Montreal, Canada, May 10-14, 2010 and Source of Document for Discussion, Rohde & Schwarz; Agenda Item 5.5.1.*

R5-120859, titled "New test case 9.2.1 LB (HSDPA, type 3i, Dual Band Dual Cell)", authored by TSG-RAN5 Working Group meeting # 54, during meeting in Dresden, Germany, Feb. 6 to 10, 2012 and Source of Change Request, Ericsson and ST-Ericsson; 34.121-1: CR CRNum.*

R5-104591, titled "DC-HSDPA Type 3i test cases: proposal for simplification," (R5-104591 hereinafter) was published as 3GPP TSG RAN WG R5 Meeting #48 by 3rd Generation Partnership Project at Madrid, Spain, on Aug. 23-27, 2010, pp. 01 through 04.*

3GPP TS 36.523-3, titled "Technical Specification Group Radio Access Network, Evolved Universal Terrestrial Radio Access (EUTRA) and Evolved Packet Core (EPC); User Equipment (UE) conformance specification Part 3: Test Suites (Release 10)", (3GPP 365233 hereinafter) was published as Technical Specification by 3rd Generation Partnership Project on.*

3GPP TS 37.571-4, titled "Technical Specification Group Radio Access Network, Universal Terrestrial Radio Access (UTRA) and Evolved Utra (E-UTRA) and Evolved Packet Core (EPC); User Equipment (UE) conformance specification for UE positioning; Part 4: Test suites (Release 10),".*

3GPP TS 36.300, titled Technical Specification Group Radio Access Network, Evolved Universal Terrestrial Radio Access (EUTRA) and Evolved Universal Terrestrial Radio Access Network; (E-UTRAN); Overall description; Stage 2 (Release 11—V11.2.0).*

Search report issued by the UK Intellectual Property Office in App. No. GB1213142.1, dated Oct. 30, 2012.

Office action issued by the Japanese Patent Office in corresponding Japanese App. No. 2013-147850, mailed May 7, 2014.

3rd Generation Partnership Project; Technical Specification Group Radio Access Network; Evolved Universal Terrestrial Radio Access (E-UTRA) and Evolved Packet Core (EPC); User Equipment (UE) conformance specification Part 3: Test Suites (Release 10); V10.0.0 (Jun. 2012) pp. 1-3, 6, m13-14, and 124.

3GPP TSG RAN WG R5 Meeting #48; DC-HSDPA Type 3i test cases: proposal for simplification; Madrid, Spain; Aug. 23-27, 2010.

Office action issued by the Chinese Patent Office in corresponding Japanese App. No. 201310312620.4, dated Jan. 18, 2016 (with translation).

* cited by examiner

CARRIER AGGREGATION TESTING METHOD AND APPARATUS FOR PERFORMING THE SAME

CROSS-REFERENCE TO RELATED APPLICATIONS

This application is based upon and claims the benefit of priority from prior British Patent Application No. 1213142.1, filed Jul. 24, 2012, the entire contents of which are incorporated herein by reference.

BACKGROUND OF THE INVENTION

1. Field of the Invention

The present invention relates to the field of wireless communication technologies and more particularly to a carrier aggregation testing method and apparatus for a wireless communication system.

2. Description of the Related Art

In wireless communication networks, e.g. according to the technical specifications of the Third Generation Partnership Project (3GPP), the concept of carrier aggregation (CA) wherein several component carriers (CC) operating in different frequency channels and being bundled in a single radio link, has been introduced.

Examples of carrier aggregation are contiguous carrier aggregation, in which the constellation consists of two or more adjacent component carriers, non contiguous intra-band carrier aggregation, in which the constellation consists of two or more non-adjacent component carriers from the same frequency band or spectrum, and inter-band carrier aggregation or spectrum aggregation, in which the constellation consists of two or more component carriers from at least two different frequency bands or spectra.

In order to improve the reliability of carrier aggregation in wireless communication networks, carrier aggregation testing of User Equipments (UE) involving more than one component carriers is performed.

Particularly, in order to perform the carrier aggregation testing, a carrier aggregation testing apparatus acting as a base station (BS) is used. For simulating all component carriers, the carrier aggregation testing apparatus needs to dimension and provide hardware and/or software resources, in accordance with the carrier aggregation tests to be performed.

However, there are carrier aggregation tests that require the presence of an increased amount of hardware and/or software resources in the carrier aggregation testing apparatus and thus, the complexity of the latter is significantly increased. Furthermore, such hardware and/or software resources are expensive and accordingly the cost of the carrier aggregation testing apparatus is high.

BRIEF SUMMARY OF THE INVENTION

It is an object of the present invention to provide a new carrier aggregation testing apparatus, advantageously of a reduced complexity and cost.

It is another object of the invention to provide a carrier aggregation testing method, using a carrier aggregation testing apparatus according to the invention.

These and other objects of the invention are achieved by means of a carrier aggregation testing method for a communication system, which method comprises the following steps:

allocating a primary component carrier between a User Equipment and a carrier aggregation testing apparatus being configured to act as a Base Station with regard to the User Equipment;

allocating at least one functionally limited secondary component carrier between the User Equipment and the carrier aggregation testing apparatus; aggregating the at least one functionally limited secondary component carrier with the primary component carrier;

executing a carrier aggregation test being based on a functionality of the at least one functionally limited secondary component carrier.

The allocation and aggregation of at least one functionally limited secondary component carrier instead of a fully functional component carrier during the carrier aggregation test is a distinguishing feature of the invention which allows to reduce the use of hardware and/or software resources in the carrier aggregation testing apparatus. Particularly, the at least one functionally limited secondary component carrier transmits a reduced number of signals and channels during the carrier aggregation test and/or performs only a subset of procedures comparing to a fully functional component carrier. Thus, a reduced amount of hardware and/or software resources is needed to be used by the carrier aggregation testing apparatus comparing to that being used in the case of a fully functional component carrier in order to perform the carrier aggregation test. Therefore, a reduced complexity and cost of the carrier aggregation testing apparatus is achieved.

In one embodiment, the at least one functionally limited secondary component carrier is a virtual component carrier supporting no physical signals.

In another embodiment, the at least one functionally limited secondary component carrier supports only downlink signals and procedures.

In a further embodiment, the at least one functionally limited secondary component carrier supports only a subset of uplink and downlink signals and/or procedures.

In a particular embodiment, in order to allocate and aggregate the at least one functionally limited secondary component carrier, the carrier aggregation testing apparatus uses only hardware and/or software resources being associated with said at least one functionally limited secondary component carrier.

The invention also achieves a carrier aggregation testing apparatus for performing carrier aggregation testing in a communication system. The carrier aggregation testing apparatus of the invention is configured to act as a Base Station with regard to a User Equipment and comprises:

means for allocating a primary component carrier between the User Equipment and the carrier aggregation testing apparatus;

means for allocating at least one functionally limited secondary component carrier between the User Equipment and the carrier aggregation testing apparatus and aggregating said at least one functionally limited secondary component carrier with the primary component carrier;

means for executing a carrier aggregation test being based on a functionality of the at least one functionally limited secondary component carrier.

In one embodiment, the at least one functionally limited secondary component carrier is a virtual component carrier configured to support no physical signals.

In another embodiment the at least one functionally limited secondary component carrier is configured to support only downlink signals and procedures.

In a further embodiment, the at least one functionally limited secondary component carrier is configured to support only selected uplink and downlink signals and/or procedures.

In one particular embodiment the carrier aggregation testing apparatus is configured to use only hardware and/or software resources being associated with said at least one functionally limited secondary component carrier for allocating and aggregating the at least one functionally limited secondary component carrier.

BRIEF DESCRIPTION OF THE SEVERAL VIEWS OF THE DRAWING

The above objects and characteristics of the present invention will be more apparent by describing an/several embodiments of the present invention in detail with reference to the accompanying drawings, in which.

DETAILED DESCRIPTION OF THE INVENTION

Hereinafter, an embodiment of the present invention will be described in greater detail with reference to the accompanying drawings.

The embodiment is applied to 3GPP LTE Advanced standards and the general concept and high level procedures for 3GPP LTE Advanced Carrier Aggregation are described in 3GPP Technical Specification 36.300. Furthermore, the invention can be applied to any wireless communication system that uses the concept of aggregating multiple carriers (for example in Multi Carrier HSPA, EV-DO Rev. B, 802.16m (so called WiMax Rel. 2), etc.).

Figure 1:
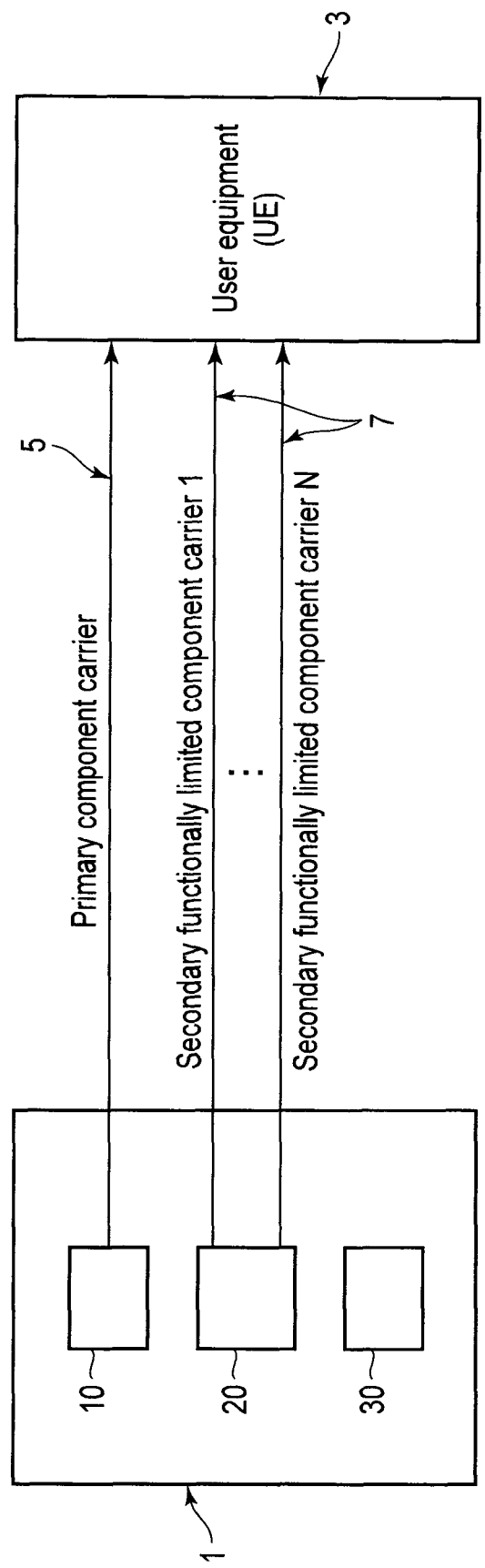
FIG. 1 illustrates a carrier aggregation testing apparatus according to an embodiment of the invention.

FIG. 1 illustrates a carrier aggregation testing apparatus 1 for performing carrier aggregation testing in a wireless communication system according to an embodiment of the invention. The carrier aggregation testing apparatus 1 has a controller which uses hardware and/or software so as to be configured to act as a Base Station with regard to a User Equipment 3 under test and comprises means 10 for allocating a primary component carrier 5 between the User Equipment 3 and the carrier aggregation testing apparatus 1. In general, means for performing primary component carrier allocation are described in 3GPP Technical Specification 36.300.

In an embodiment, the means 10 comprise a device including an information processing system capable, based on a user input, of allocating and configuring hardware resources for the primary component carrier 5 in the carrier aggregation testing apparatus 1 and configuring the User Equipment 3 to use the primary component carrier 5.

Furthermore, the carrier aggregation testing apparatus 1 comprises means 20 for allocating at least one functionally limited secondary component carrier 7 between the User Equipment 3 and the carrier aggregation testing apparatus 1 and aggregating the at least one functionally limited component carrier 7 with the primary component carrier 5. Generally, means for performing secondary component carrier's allocation and aggregation are described in 3GPP Technical Specification 36.300.

In an embodiment, the means 20 comprise a device including an information processing system capable, based on a user input, of allocating and configuring hardware resources for the functionally limited secondary component carrier 7 in the carrier aggregation testing apparatus 1 and configuring the User Equipment 3 to use the functionally limited secondary component carrier 7. Additionally, the means 20 are configured to perform the aggregation of the at least one functionally limited secondary component carrier 7 with the primary component carrier 5, by using messages exchanged between the carrier aggregation testing apparatus 1 and the User Equipment 3 over the primary component carrier 5.

It is well known that a fully functional component carrier is a component carrier that transmits all signals and channels and performs procedures required for the operation of such carrier. Thus, generally, a carrier aggregation testing apparatus that uses only fully functional component carriers which transmit all signals and channels, requires a significant amount of hardware and/or software resources (e.g. resources for generation of radio signals, resources for transmission and reception of radio signals, memory resources, processing units, etc.).

Accordingly, the allocation and aggregation of the at least one functionally limited secondary component carrier 7 as described above, which is a component carrier that transmits a reduced number of signals and channels during the carrier aggregation test and/or performs only a subset of procedures comparing to a fully functional component carrier, has the advantage of reducing the hardware and/or software resources needed to be used by the carrier aggregation testing apparatus 1. Thus, a reduced complexity and cost of the carrier aggregation testing apparatus is achieved.

In an embodiment, the at least one functionally limited secondary component carrier 7 is a virtual component carrier configured to support no physical signals.

In another embodiment, the at least one functionally limited secondary component carrier 7 is configured to support only downlink signals and procedures.

In a further embodiment, the at least one functionally limited secondary component carrier 7 is configured to support only a subset of uplink and downlink signals and/or procedures.

It is important to note that during the carrier aggregation test, the User Equipment 3 under test is not aware of the fact that the carrier aggregation testing apparatus 1 uses functionally limited secondary component carriers. More particularly, the User Equipment 3 recognizes the functionally limited component carriers as fully functional component carriers, thus fulfilling the standards specifications of a real wireless communication system. Accordingly, in order to execute the carrier aggregation test and particularly to allocate and aggregate the at least one functionally limited secondary component carrier 7, the carrier aggregation testing apparatus 1 can use only hardware and/or software resources being associated with the at least one functionally limited secondary component carrier 7 and thus, as explained above a reduced complexity and cost of the testing apparatus 1 is achieved.

In an example, the at least one functionally limited secondary component carrier 7 uses only resources for generation and transmission of radio signals. In another example, the at least one functionally limited secondary component carrier 7 uses only resources for generation, transmission and reception of a subset of all radio signals required in a fully functional component carrier.

Furthermore, the carrier aggregation testing apparatus 1 comprises means 30 for executing a carrier aggregation test being based on a functionality of the at least one functionally limited secondary component carrier 7.

It is important to note that the carrier aggregation test can be based on more than one functionalities of the at least one functionally limited secondary component carrier 7 and it is not particularly limited to one functionality. The range of functionalities depends on the carrier aggregation test to be executed.

In an embodiment, the means 30 comprise an information processing system capable of executing a test script or an otherwise automated test.

In another embodiment, the means 30 are managed by an operator for executing the carrier aggregation test.

Generally, means for executing 3GPP carrier aggregation testing are described in 3GPP Technical Specification 36.523-3. However, there might be different implementations of the carrier aggregation testing apparatus depending on the carrier aggregation tests to be performed.

Examples of carrier aggregation tests that can be performed by allocating functionally limited secondary component carriers include the addition and removal of one or more secondary component carriers, the change of secondary component carriers during connected mode mobility and the configuration and performance of secondary component carrier measurements.

It is important to note that the exchange of signals between the carrier aggregation testing apparatus 1 and the User Equipment 3 during the carrier aggregation test can be performed by wired connections, for example, via a coaxial cable, or by means of wireless connections, for example, the carrier aggregation testing apparatus 1 may further comprise an antenna for exchanging the signals with the User Equipment 3.

Figure 2:
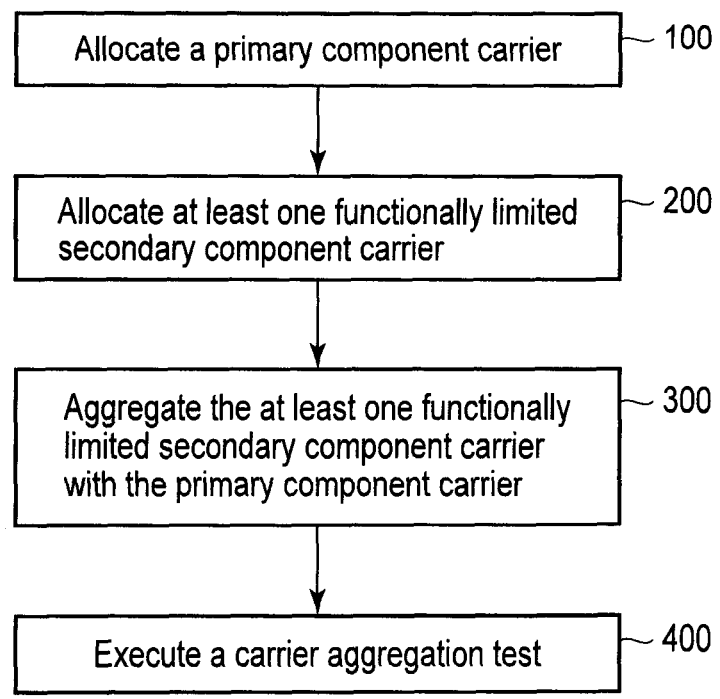
FIG. 2 illustrates a flowchart of a carrier aggregation testing method according to an embodiment of the invention.

FIG. 2, illustrates the steps of a carrier aggregation testing method for a wireless communication system comprising a User Equipment 3 and a carrier aggregation testing apparatus 1 being configured to act as a base station.

In a step 100, a primary component carrier 5 is allocated between the User Equipment 3 and the carrier aggregation testing apparatus 1.

The primary component carrier allocation can be performed by the means 10, as described above.

In a step 200, at least one functionally limited secondary component carrier 7 is allocated between the User Equipment 3 and the carrier aggregation testing apparatus 1.

The allocation of the at least one functionally limited secondary component carrier 7 can be performed by the means 20, as described above.

In a step 300, the functionally limited secondary component carrier 7 is aggregated with the primary component carrier 5.

This aggregation can be performed by the means 20 which are described above, by using messages exchanged between the carrier aggregation testing apparatus 1 and the User Equipment 3 over the primary component carrier 5.

In a step 400, a carrier aggregation test being based on a functionality of the at least one functionally limited secondary component carrier 7, is executed.

The execution of the carrier aggregation test can be performed by the means 30 which are described above.

In an embodiment, the at least one functionally limited secondary component carrier 7 is a virtual component carrier supporting no physical signals.

In another embodiment, the at least one functionally limited secondary component carrier 7 supports only downlink signals and procedures.

In a further embodiment, the at least one functionally limited secondary component carrier 7 supports only a subset of uplink and downlink signals and/or procedures.

Another example of a carrier aggregation test based on a functionality of the at least one functionally limited secondary component carrier comprises the following steps:

the carrier aggregation testing apparatus allocates a primary component carrier between a User Equipment and a carrier aggregation testing apparatus being configured to act as a Base Station with regard to the User Equipment;

the carrier aggregation testing apparatus allocates and aggregates a functionally limited secondary component carrier, wherein the carrier aggregation testing apparatus allocates only hardware resources for cell reference signal generation and transmission but not for transmission of other signals or channels, nor for signal reception on this carrier;

the carrier aggregation testing apparatus configures the User Equipment to perform signal strength measurements on the frequency used by the functionally limited secondary component carrier;

the User Equipment measures the strength of the cell reference signal transmitted by the functionally limited secondary component carrier and reports these measurements to the carrier aggregation testing apparatus over the primary component carrier.

What is claimed is:

1. A carrier aggregation testing method for a communication system, the method comprising the steps of:
   allocating a primary component carrier between a User Equipment and a carrier aggregation testing apparatus; wherein the carrier aggregation testing apparatus, is configured to act as a Base Station with regard to the User Equipment;
   allocating at least one functionally limited secondary component carrier that transmits a reduced number of signals and channels between the User Equipment and the carrier aggregation testing apparatus;
   aggregating the at least one functionally limited secondary component carrier with the primary component carrier;
   executing a carrier aggregation test being based on a functionality of the at least one functionally limited secondary component carrier.

2. The method according to claim 1, wherein the at least one functionally limited secondary component carrier is a virtual component carrier supporting no physical signals.

3. The method according to claim 1, wherein the at least one functionally limited secondary component carrier supports only downlink signals and procedures.

4. The method according to claim 1, wherein the at least one functionally limited secondary component carrier supports only a subset of uplink and downlink signals and procedures.

5. The method according to claim 1, wherein for allocating and aggregating the at least one functionally limited secondary component carrier, the carrier aggregation testing apparatus uses hardware and software resources being associated with said at least one functionally limited secondary component carrier.

6. A carrier aggregation testing apparatus for performing carrier aggregation testing in a communication system, said carrier aggregation testing apparatus being configured to act as a Base Station with regard to a User Equipment and comprising:
   a first circuit adapted to allocate a primary component carrier between the User Equipment and the carrier aggregation testing apparatus;
   a second circuit adapted to allocate at least one functionally limited secondary component carrier that transmits a reduced number of signals and channels between the User Equipment and the carrier aggregation testing apparatus and aggregating said at least one functionally limited secondary component carrier with the primary component carrier;

a third circuit adapted to execute a carrier aggregation test being based on a functionality of the at least one functionally limited secondary component carrier.

7. The carrier aggregation testing apparatus according to claim 6, wherein the at least one functionally limited secondary component carrier is a virtual component carrier configured to support no physical signals.

8. The carrier aggregation testing apparatus according to claim 6, wherein the at least one functionally limited secondary component carrier is configured to support only downlink signals and procedures.

9. The carrier aggregation testing apparatus according to claim 6, wherein the at least one functionally limited secondary component carrier is configured to support only selected uplink and downlink signals and procedures.

10. A The carrier aggregation testing apparatus according to claim 6, wherein the carrier aggregation testing apparatus is configured to use hardware and software resources being associated with said at least one functionally limited secondary component carrier for allocating and aggregating the at least one functionally limited secondary component carrier.

\* \* \* \* \*